US011224197B1

(12) United States Patent
Williams (10) Patent No.: US 11,224,197 B1
(45) Date of Patent: Jan. 18, 2022

(54) PET PRIVACY BARRIER (71) Applicant: Jacqueline Williams, Crosby, TX (US)

(72) Inventor: Jacqueline Williams, Crosby, TX (US)

( * ) Notice: Subject to any disclaimer, the term of this patent is extended or adjusted under 35 U.S.C. 154(b) by 356 days.

(21) Appl. No.: 16/459,734

(22) Filed: Jul. 2, 2019

(51) Int. Cl.
A01K 1/00 (2006.01)
E04H 15/00 (2006.01)
A41G 1/00 (2006.01)
A01K 1/015 (2006.01)
A01K 1/035 (2006.01)
A01K 1/03 (2006.01)

(52) U.S. Cl.
CPC ............ A01K 1/0035 (2013.01); A01K 1/015 (2013.01); A01K 1/033 (2013.01); A01K 1/0353 (2013.01); A01K 1/0356 (2013.01); A41G 1/009 (2013.01); E04H 15/001 (2013.01); E04H 15/003 (2013.01); E04H 15/005 (2013.01)

(58) Field of Classification Search
CPC .... A01K 1/0035; A01K 1/0353; A01K 1/033; E04H 15/003; A45B 2023/0093
USPC ....... 135/87, 116, 120.1, 900, 902; 119/496, 119/499, 519, 523, 524; 5/418
See application file for complete search history.

(56) References Cited

U.S. PATENT DOCUMENTS

| 1,100,310 | A | * | 6/1914 | Lazarus | E04H 15/46 135/139 |
| 1,674,990 | A | * | 6/1928 | Peterson | E04H 15/003 135/87 |
| 2,010,472 | A | * | 8/1935 | Angel | E04H 15/003 135/157 |
| 2,027,984 | A | * | 1/1936 | Kapp | B23Q 17/24 135/154 |
| 2,036,033 | A | * | 3/1936 | Fisher | E04H 15/56 135/133 |
| 2,070,484 | A | * | 2/1937 | Jones | E04H 15/003 135/151 |
| 2,134,879 | A | * | 11/1938 | Samuels | E04H 15/003 135/87 |

(Continued)

FOREIGN PATENT DOCUMENTS

| CA | 2197906 A1 * | 9/1998 | ........... E04H 15/003 |
| DE | 102015010459 A1 * | 2/2017 | ............. A45B 15/00 |
| FR | 1326537 A * | 5/1963 | ........... E04H 15/003 |

OTHER PUBLICATIONS

8 page PDF of machine translation of DE 102015010459. (Year: 2017).*

Primary Examiner — Robert Canfield
(74) Attorney, Agent, or Firm — Kyle A. Fletcher, Esq.

(57) ABSTRACT

The pet privacy barrier creates a protected space. The protected space formed by the pet privacy barrier provides a companion animal with a sense of security that allows the companion animal to generate the excretions and eliminations that form the befoulment of the companion animal. The pet privacy barrier comprises a barrier structure, a detachable canopy, and a base carpet. The barrier structure mounts on the base carpet. The detachable canopy removably attaches to the barrier structure. The barrier structure is a vertical structure that forms a portion of the boundary of the protected space. The detachable canopy is an elevated horizontal structure that forms a portion of the boundary of the protected space. The base carpet forms the pedestal of the pet privacy barrier. The base carpet simulates turf to provide a more natural environment for the activities of the companion animal.

18 Claims, 6 Drawing Sheets (56) References Cited

U.S. PATENT DOCUMENTS

| | | | | |
|---|---|---|---|---|
| 2,619,101 | A * | 11/1952 | McGerry | E04H 15/003 135/87 |
| 2,818,078 | A * | 12/1957 | White | E04H 15/003 135/154 |
| 2,848,756 | A * | 8/1958 | McCann | E04H 15/003 52/63 |
| 2,882,913 | A * | 4/1959 | Beauregard | E04H 15/003 135/151 |
| 3,537,688 | A * | 11/1970 | Stein | E04H 15/003 135/95 |
| 3,814,058 | A * | 6/1974 | Thompson | A01K 1/033 119/482 |
| 4,407,319 | A * | 10/1983 | Shultz | E04H 15/003 135/87 |
| 4,599,754 | A * | 7/1986 | Mairs, III | A47G 9/06 135/96 |
| 4,685,484 | A * | 8/1987 | Moneta | E04H 15/003 135/117 |
| 4,860,777 | A * | 8/1989 | Orlando | E04H 15/003 135/87 |
| 4,964,802 | A * | 10/1990 | Weller | A63F 9/06 434/96 |
| 4,969,500 | A * | 11/1990 | Makosa | E04H 15/003 135/902 |
| 5,121,710 | A * | 6/1992 | Gonzalez | A01K 1/033 119/498 |
| D349,980 | S | 8/1994 | Northrop | |
| 5,452,896 | A * | 9/1995 | Core | A63B 71/022 273/410 |
| 6,142,704 | A * | 11/2000 | Coyne | E02B 3/04 256/13 |
| 6,845,781 | B1 * | 1/2005 | Brown | B32B 27/12 135/116 |
| 7,322,315 | B2 | 1/2008 | Brewer | |
| 8,141,518 | B2 | 3/2012 | Pierpont | |
| 9,206,581 | B2 * | 12/2015 | Mollick | E02D 27/32 |
| 10,327,418 | B2 * | 6/2019 | Johnson | E04H 12/2238 |
| 2006/0236952 | A1 * | 10/2006 | King | A01K 1/03 119/499 |
| 2007/0215193 | A1 * | 9/2007 | Flores | E04H 15/003 135/157 |
| 2007/0227461 | A1 | 10/2007 | Chern | |
| 2008/0251026 | A1 * | 10/2008 | Bell | A01K 1/0125 119/168 |
| 2009/0004409 | A1 * | 1/2009 | McCoy | A41G 1/009 428/17 |
| 2012/0006274 | A1 | 9/2012 | Feld | |
| 2019/0032339 | A1 * | 1/2019 | Matturro | E04H 15/008 |

* cited by examiner

PET PRIVACY BARRIER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of agriculture including animal husbandry, more specifically, housing and equipment for a domestic animal. (A01K1/03)

SUMMARY OF INVENTION

The pet privacy barrier is a barrier structure. The pet privacy barrier is configured for use with a companion animal. The pet privacy barrier creates a protected space. The protected space formed by the pet privacy barrier provides the companion animal with a sense of security that allows the companion animal to generate the excretions and eliminations that form the befoulment of the companion animal. The pet privacy barrier comprises a barrier structure, a detachable canopy, and a base carpet. The barrier structure mounts on the base carpet. The detachable canopy removably attaches to the barrier structure. The barrier structure is a vertical structure that forms a portion of the boundary of the protected space. The detachable canopy is an elevated horizontal structure that forms a portion of the boundary of the protected space. The base carpet forms the pedestal of the pet privacy barrier. The base carpet simulates turf to provide a more natural environment for the activities of the companion animal.

These together with additional objects, features and advantages of the pet privacy barrier will be readily apparent to those of ordinary skill in the art upon reading the following detailed description of the presently preferred, but nonetheless illustrative, embodiments when taken in conjunction with the accompanying drawings.

In this respect, before explaining the current embodiments of the pet privacy barrier in detail, it is to be understood that the pet privacy barrier is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the pet privacy barrier.

It is therefore important that the claims be regarded as including such equivalent construction insofar as they do not depart from the spirit and scope of the pet privacy barrier. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
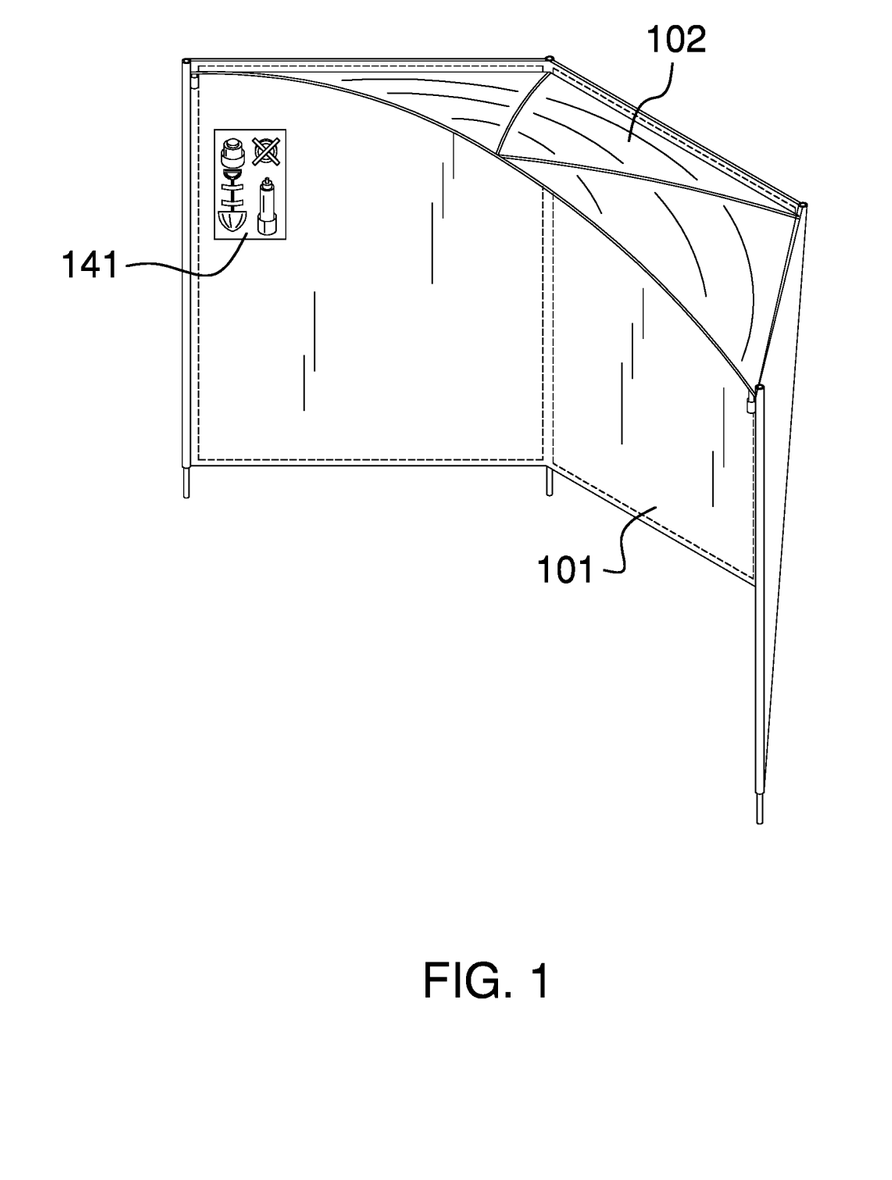
FIG. 1 is a perspective view of an embodiment of the disclosure.
Figure 2:
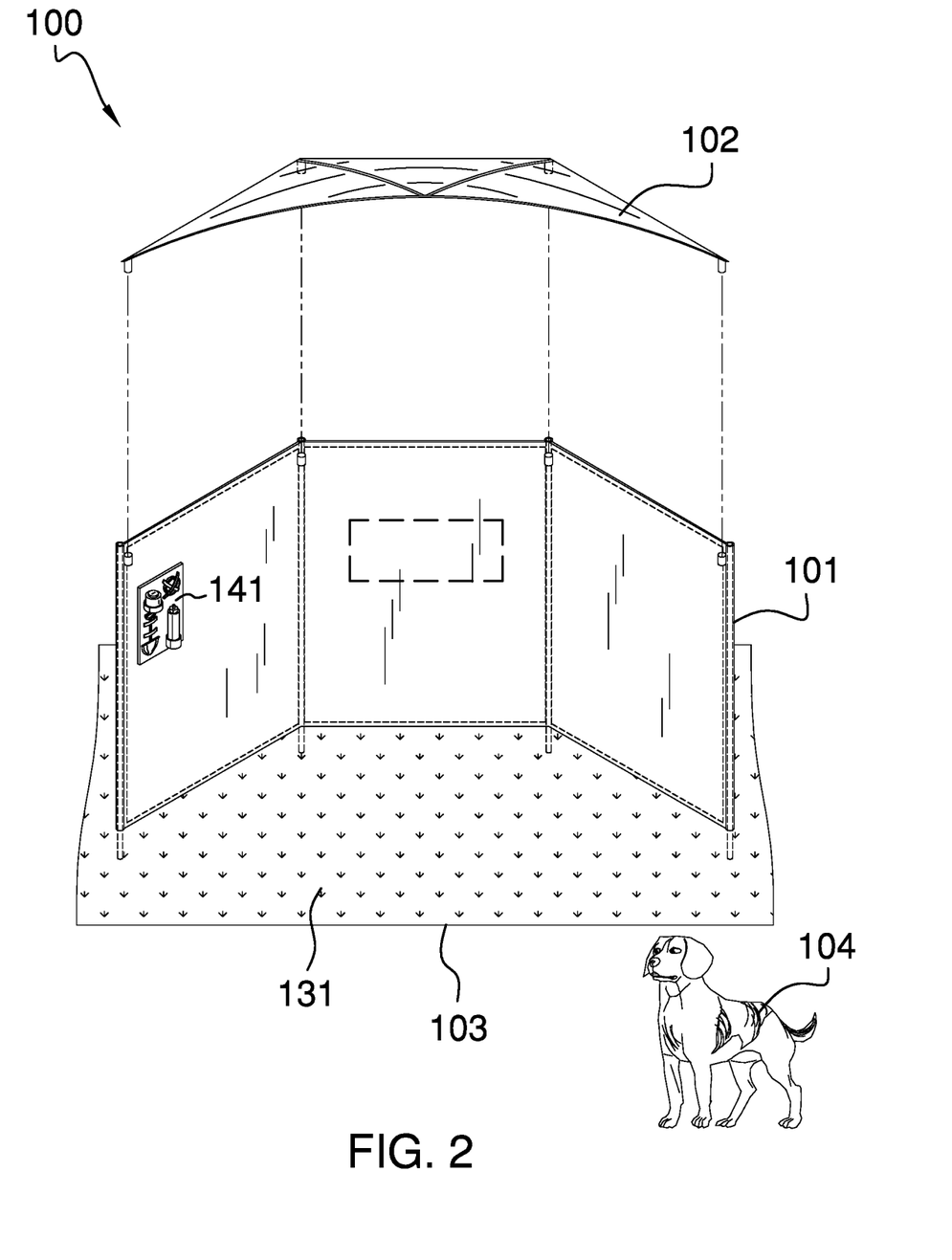
FIG. 2 is an exploded view of an embodiment of the disclosure.
Figure 3:
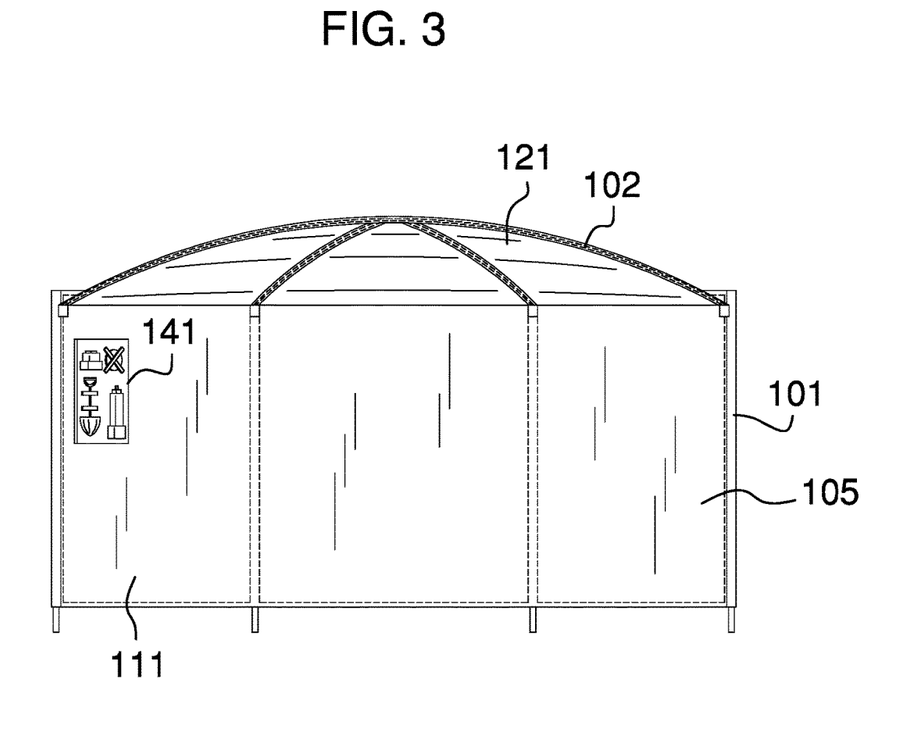
FIG. 3 is a front view of an embodiment of the disclosure.
Figure 4:
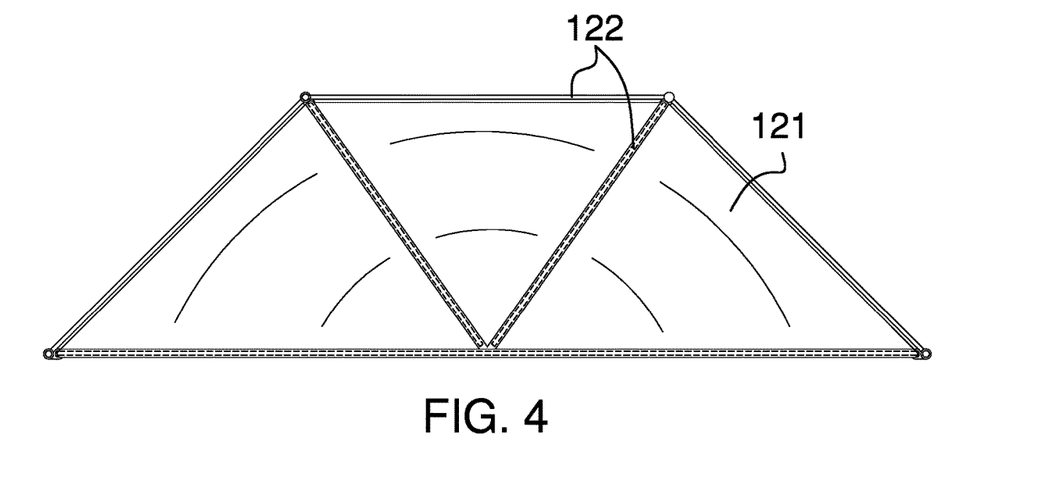
FIG. 4 is a top view of an embodiment of the disclosure.
Figure 5:
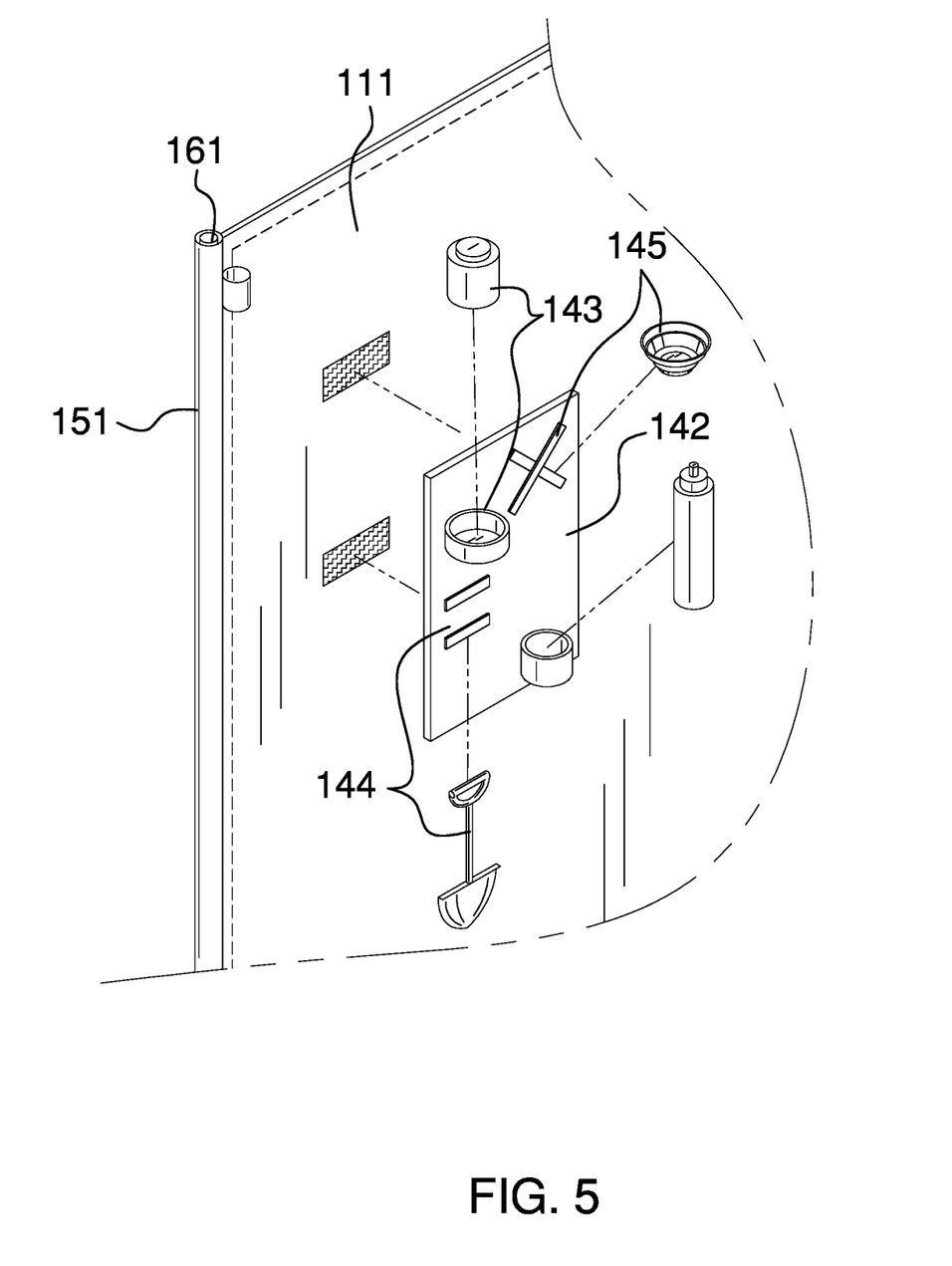
FIG. 5 is a detail view of an embodiment of the disclosure.
Figure 6:
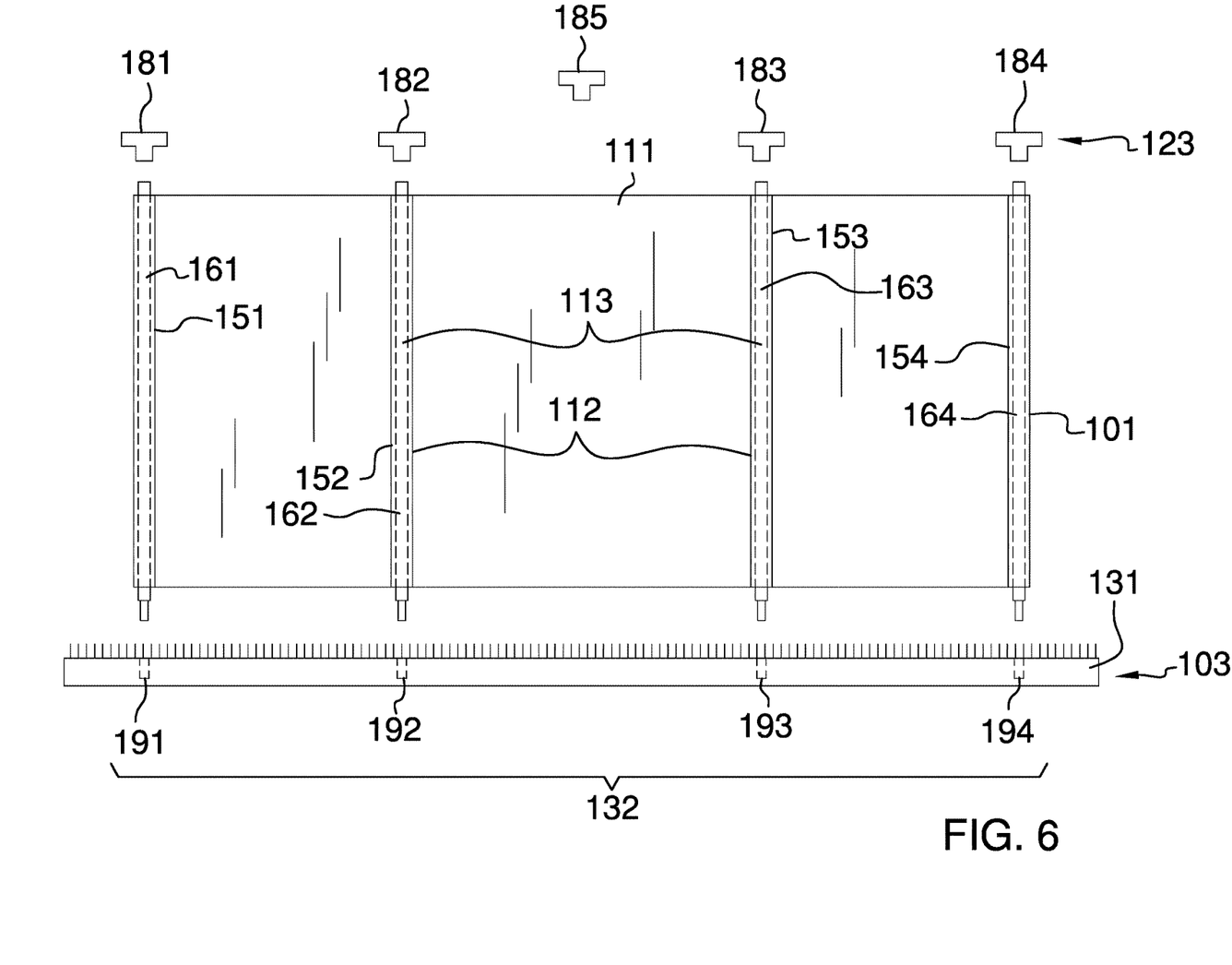
FIG. 6 is a detail view of an embodiment of the disclosure.
Figure 7:
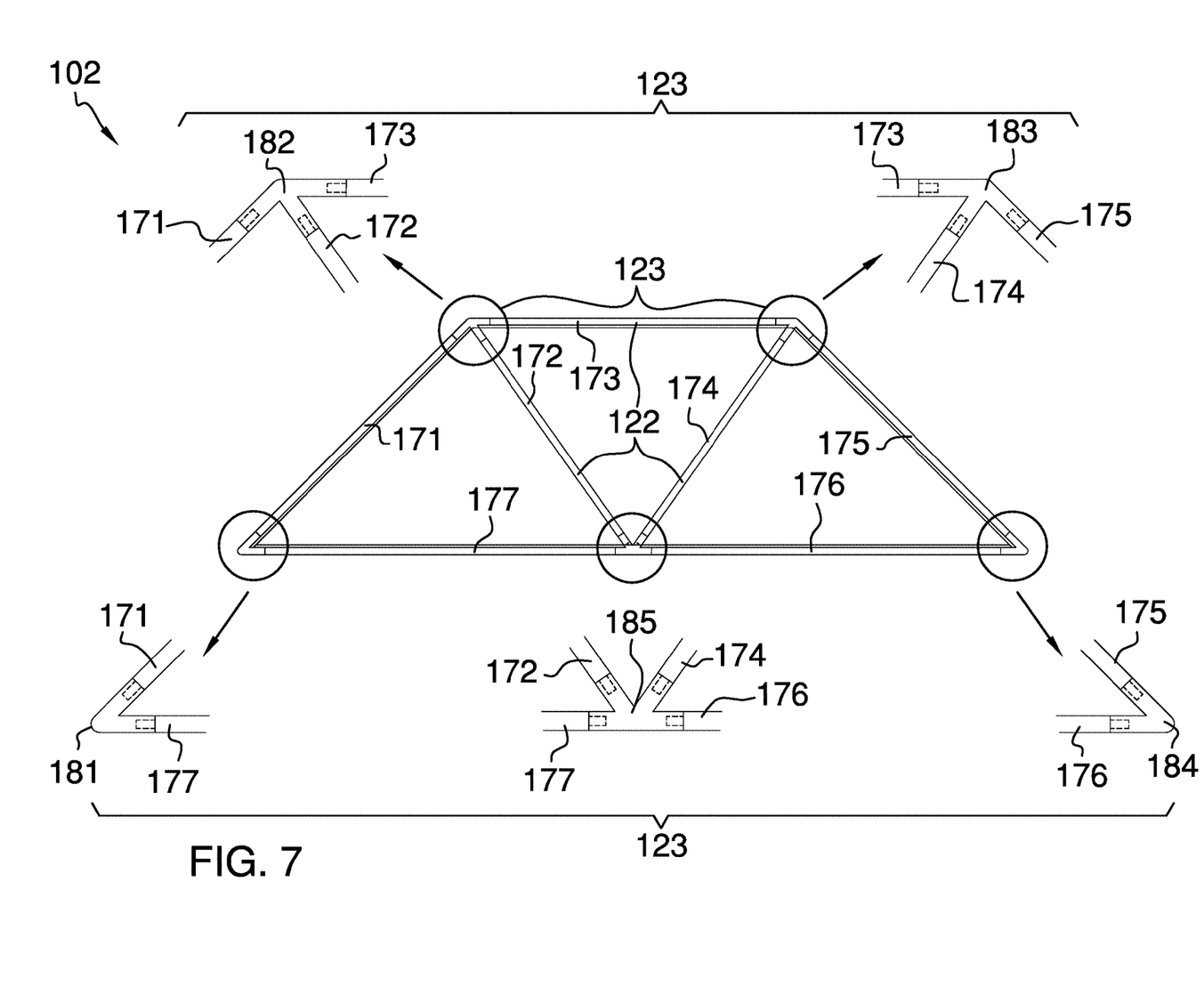
FIG. 7 is a detail view of an embodiment of the disclosure.

Detailed reference will now be made to one or more potential embodiments of the disclosure, which are illustrated in FIGS. 1 through 7.

The pet privacy barrier 100 (hereinafter invention) is a barrier structure 101. The invention 100 is configured for use with a companion animal 104. The invention 100 creates a protected space 105. The protected space 105 formed by the invention 100 provides the companion animal 104 with a sense of security that allows the companion animal 104 to generate the excretions and eliminations that form the befoulment of the companion animal 104. The companion animal 104 is defined elsewhere in this disclosure. The protected space 105 is defined elsewhere in this disclosure.

The invention 100 comprises a barrier structure 101, a detachable canopy 102, and a base carpet 103. The barrier structure 101 mounts on the base carpet 103. The detachable canopy 102 removably attaches to the barrier structure 101. The barrier structure 101 is a vertical structure that forms a portion of the boundary of the protected space 105. The detachable canopy 102 is an elevated horizontal structure that forms a portion of the boundary of the protected space 105. The base carpet 103 forms the pedestal of the invention 100. The base carpet 103 simulates turf to provide a more natural environment for the activities of the companion animal 104.

The barrier structure 101 is a vertically oriented structure. The barrier structure 101 is a textile-based structure. The barrier structure 101 forms an opaque structure that blocks the field of view of an observer such that a protected space 105 is formed for the companion animal 104 on the side of the barrier structure 101 opposite to the observer. The barrier structure 101 comprises a first textile sheeting 111, a plurality of sleeves 112, and a plurality of stanchions 113.

The first textile sheeting 111 is a textile-based fabric structure. The first textile sheeting 111 is formed from nylon. The first textile sheeting 111 is cut in a rectilinear shape. The first textile sheeting 111 forms the opaque vertical structure that creates the protected space 105 formed by the invention 100. The first textile sheeting 111 further comprises an accessory station 141.

The accessory station 141 attaches to the first textile sheeting 111 of the barrier structure 101. The accessory station 141 is a kit that contains items useful for the maintenance of the companion animal 104 of the invention 100. The accessory station 141 comprises a station plate 142, a bag holder 143, a shovel and mount 144, and a bowl and mount 145.

The station plate 142 is a disk-shaped structure. The station plate 142 forms a plate that attaches to the first textile sheeting 111 of the barrier structure 101. The station plate 142 form a rigid structure to which the station plate 142, the bag holder 143, the shovel and mount 144, and the bowl and mount 145 attach. The bag holder 143 is a containment structure attached to the station plate 142 that contains one or more bags used for disposing of the befoulment deposits of the companion animal 104. The shovel and mount 144 comprises a tool for moving the deposited befoulment into a disposal bag and the apparatus required to attach the tool to the station plate 142. The bowl and mount 145 comprises a bowl used to provide the companion animal 104 with food and water and the apparatus required to attach the bowl to the station plate 142.

Each of the plurality of sleeves 112 forms a channel, also referred to a rouleau that is attached to the first textile sheeting 111. Each of the plurality of sleeves 112 is sized to receive a stanchion selected from the plurality of stanchions 113. Each of the plurality of sleeves 112 attaches the selected stanchion to the first textile sheeting 111 such that the selected stanchion holds the first textile sheeting 111 in a vertical orientation. The plurality of sleeves 112 comprises a first sleeve 151, a second sleeve 152, a third sleeve 153, and a fourth sleeve 154.

The first sleeve 151 is a rouleau structure that attaches to the first textile sheeting 111. The second sleeve 152 is a channel structure that attaches to the first textile sheeting 111. The third sleeve 153 is a channel structure that attaches to the first textile sheeting 111. The fourth sleeve 154 is a rouleau structure that attaches to the first textile sheeting 111. Methods to attach rouleaus and channels to textile-based sheeting are well-known and documented in the apparel and textile arts.

Each of the plurality of stanchions 113 is a prism-shaped shaft. Each of the plurality of stanchions 113 inserts into and through a sleeve selected from the plurality of sleeves 112. The plurality of stanchions 113 support the first textile sheeting 111 in a vertical orientation. An end of each of the plurality of stanchions 113 attaches to the base carpet 103. The end of each of the plurality of stanchions 113 that is distal from the base carpet 103 removably attaches to the detachable canopy 102. The plurality of stanchions 113 comprises a first stanchion 161, a second stanchion 162, a third stanchion 163, and a fourth stanchion 164.

The first stanchion 161 is a prism-shaped shaft. The second stanchion 162 is a prism-shaped shaft. The span of the length of the second stanchion 162 equals the span of the length of the first stanchion 161. The third stanchion 163 is a prism-shaped shaft. The span of the length of the third stanchion 163 equals the span of the length of the second stanchion 162. The fourth stanchion 164 is a prism-shaped shaft. The span of the length of the fourth stanchion 164 equals the span of the length of the third stanchion 163.

The detachable canopy 102 is an elevated horizontal structure. The detachable canopy 102 is a textile-based structure. The detachable canopy 102 forms the superior structure of the invention 100. The detachable canopy 102 removably attaches to the barrier structure 101. The detachable canopy 102 protects the superior side of the protected space 105 from weather. The detachable canopy 102 comprises a second textile sheeting 121, a plurality of beams 122, and a plurality of fittings 123. The plurality of beams 122 and the plurality of fittings 123 form an openwork structure on which the second textile sheeting 121 drapes to form the detachable canopy 102. Each of the plurality of fittings 123 removably attaches to a stanchion selected from the plurality of stanchions 113.

The second textile sheeting 121 is a textile-based fabric structure. The second textile sheeting 121 is formed from nylon. The second textile sheeting 121 is cut in a rectilinear shape. The second textile sheeting 121 forms the elevated structure that creates an opaque superior boundary of the protected space 105 formed by the invention 100.

Each of the plurality of beams 122 is a prism-shaped shaft. Each of the plurality of beams 122 removably attaches a fitting initially selected from the plurality of fittings 123 to a fitting subsequently selected from the plurality of fittings 123. The plurality of fittings 123 interconnect the plurality of beams 122 to each other. The plurality of beams 122 comprises a first beam 171, a second beam 172, a third beam 173, a fourth beam 174, a fifth beam 175, a sixth beam 176, and a seventh beam 177.

The first beam 171 is a prism-shaped structure selected from the plurality of beams 122. The second beam 172 is a prism-shaped structure selected from the plurality of beams 122. The third beam 173 is a prism-shaped structure selected from the plurality of beams 122. The fourth beam 174 is a prism-shaped structure selected from the plurality of beams 122. The fifth beam 175 is a prism-shaped structure selected from the plurality of beams 122. The sixth beam 176 is a prism-shaped structure selected from the plurality of beams 122. The seventh beam 177 is a prism-shaped structure selected from the plurality of beams 122.

Each of the plurality of fittings 123 is a mechanical structure. Each of the plurality of fittings 123 removably attaches a beam initially selected from the plurality of beams with a beam subsequently selected from the plurality of beams 122. The plurality of fittings 123 comprises a first fitting 181, a second fitting 182, a third fitting 183, a fourth fitting 184, and a fifth fitting 185.

The first fitting 181 is a three-port fitting that attaches to the first beam 171, the seventh beam 177, and the first stanchion 161. The second fitting 182 is a four-port fitting that attaches to the first beam 171, the second beam 172, the third beam 173, and the second stanchion 162. The third fitting 183 is a four-port fitting that attaches to the third beam 173, the fourth beam 174, the fifth beam 175, and the third stanchion 163. The fourth fitting 184 is a three-port fitting that attaches to the fifth beam 175, the sixth beam 176, and the fourth stanchion 164. The fifth fitting 185 is a four-port fitting that attaches to the second beam 172, the fourth beam 174, the sixth beam 176, and the seventh beam 177.

The base carpet 103 forms the inferior structure of the invention 100. The base carpet 103 forms a pedestal on which the barrier structure 101 and the detachable canopy 102 mount. The base carpet 103 simulates the look and feel of turf such that the companion animal 104 feels comfortable to use the base carpet 103 for the deposit of biological eliminations and excretions associated with befoulment. The base carpet 103 comprises an artificial turf 131 and a plurality of mounting mortises 132.

The artificial turf 131 is the element of the base carpet 103 that provides the simulated turf on which the companion animal 104 deposits befoulment. The artificial turf 131 is a well-known and commercially available structure. The artificial turf 131 covers a supporting surface such that the artificial turf 131 protects the supporting surface from the deposited befoulment.

Each of the plurality of mounting mortises 132 is mortise like structure formed in the artificial turf 131. Each of the plurality of mounting mortises 132 receives a stanchion selected from the plurality of stanchions 113. Each of the plurality of mounting mortises 132 supports the selected stanchion such that the center axis of the prism structure of the selected stanchion projects vertically away from the artificial turf 131 of the base carpet 103. The plurality of mounting mortises 132 attach the barrier structure 101 to the base carpet 103. The plurality of mounting mortises 132 comprises a first mounting mortise 191, a second mounting mortise 192, a third mounting mortise 193, and a fourth mounting mortise 194.

The first mounting mortise 191 is a mounting mortise selected from the plurality of mounting mortises 132. The first mounting mortise 191 has a capped tube structure. The second mounting mortise 192 is a mounting mortise selected from the plurality of mounting mortises 132. The second mounting mortise 192 has a capped tube structure. The third mounting mortise 193 is a mounting mortise selected from the plurality of mounting mortises 132. The third mounting mortise 193 has a capped tube structure. The fourth mounting mortise 194 is a mounting mortise selected from the plurality of mounting mortises 132. The fourth mounting mortise 194 has a capped tube structure.

The following three paragraphs describe the assembly of the invention 100.

The first stanchion 161 inserts through the first sleeve 151 of the barrier structure 101 to insert into the first mounting mortise 191 of the base carpet 103. The second stanchion 162 inserts through the second sleeve 152 of the barrier structure 101 to insert into the second mounting mortise 192 of the base carpet 103. The third stanchion 163 inserts through the third sleeve 153 of the barrier structure 101 to insert into the third mounting mortise 193 of the base carpet 103. The fourth stanchion 164 inserts through the fourth sleeve 154 of the barrier structure 101 to insert into the fourth mounting mortise 194 of the base carpet 103.

The end of the first stanchion 161 that is distal from the first mounting mortise 191 inserts into the first fitting 181. The second stanchion 162 that is distal from the second mounting mortise 192 inserts into the second fitting 182. The third stanchion 163 that is distal from the third mounting mortise 193 inserts into the third fitting 183. The fourth stanchion 164 that is distal from the fourth mounting mortise 194 inserts into the fourth fitting 184.

The first beam 171 attaches the first fitting 181 to the second fitting 182. The second beam 172 attaches the second fitting 182 to the fifth fitting 185. The third beam 173 attaches the second fitting 182 to the third fitting 183. The fourth beam 174 attaches the third fitting 183 to the fifth fitting 185. The fifth beam 175 attaches the third fitting 183 to the fourth fitting 184. The sixth beam 176 attaches the fourth fitting 184 to the fifth fitting 185. The seventh beam 177 attaches the first fitting 181 to the fifth fitting 185.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Amide: As used in this disclosure, an amide is a functional group with a structure selected from the group consisting of: R1-(C=O)—(NH2), R1-(C=O)—(NH—R2), and R1-(C=O)—(NR2-R3). In this configuration, R1, R2, and R3 are organic molecules and R2 and R3 bond directly to the nitrogen (N). A polyamide refers to a polymer chain where the monomers are joined using an amide bond.

Barrier: As used in this disclosure, a barrier is a physical obstacle that forms a boundary between a first space and a second space. The barrier prevents the passage of an object between the first space and the second space.

Beam: As used in this disclosure, a beam is a horizontally oriented load bearing structure that is commonly used to support a floor or a roof of a building.

Befoulment: As used in this disclosure, befoulment refers to the excrement and other biological eliminations of a companion animal.

Bowl: As used in this disclosure, a bowl is a rounded hollow containment structure used to store a solid or a liquid.

Canopy: As used in this disclosure, a canopy is a cover, usually made of fabric that is placed above an area and creates a protected space within which people or objects are protected from the environment.

Capped Tube: As used in this disclosure, a capped tube is a tube with one closed end and one open end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Companion Animal: As used in this disclosure, a companion animal is a domesticated animal that is maintained primarily for companionship. A companion animal is often referred to as a pet.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar. Use Prism, pyramid, geometrically similar, truncated, align Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Drape: As used in this disclosure, to drape means to cover an object with a sheeting.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Ferrule: As used in this disclosure, a ferrule is a prism-shaped device that inserts into the end of a prism-shaped structure such that the center axis of the prism-shaped device is aligned with the center axis of the prism-shaped structure to form a composite prism structure. The outer diameter of the prism-shaped device is lesser than the outer diameter of the prism-shaped structure. Objects attached to the prism-shaped device are thereby attached to the prism-shaped structure in the manner of a mortise and tenon.

Field of View: As used in this disclosure, a field of view refers to one or more angles which delimits an area from which electromagnetic radiation will be sensed by a person or an image sensor.

Flexible: As used in this disclosure, flexible refers to an object or material that will deform when a force is applied to it but that will not necessarily return to its original shape when the deforming force is removed.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Inner Dimension: As used in this disclosure, the term inner dimension describes the span from a first inside or interior surface of a container to a second inside or interior surface of a container. The term is used in much the same way that a plumber would refer to the inner diameter of a pipe.

Lawn: As used in this disclosure, a lawn refers to a field that grows grass. The grass in a lawn is often referred to as turf.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Mortise: As used in this disclosure, a mortise is a prism-shaped negative spaced formed in an object that is designed to receive a geometrically similar object referred to as a tenon.

Nylon: As used in this disclosure, nylon (CAS: Type 6: 25038-54-5; Type 6,6: 32131-17-2) refers to a polyamide polymer chain.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Opaque: As used in this disclosure, opaque refers to an object or material that prevents the passage of radiation through the object or material.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pedestal: As used in this disclosure, a pedestal is an intermediary load bearing structure that that forms a load path between a supporting surface and an object, structure, or load.

Perimeter: As used in this disclosure, a perimeter is one or more curved or straight lines that bounds an enclosed area on a plane or surface. The perimeter of a circle is commonly referred to as a circumference.

Polymer: As used in this disclosure, a polymer refers to a molecular chain that comprises multiple repeating units known as monomers. The repeating unit may be an atom or a molecular structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a space formed by a boundary structure. The boundary structure forms a barrier that protects objects within the protected space from potential dangers from the other side of the boundary.

Rectilinear: As used in this disclosure, rectilinear is an adjective that is used to describe an object that: 1) moves in a straight line or lines; 2) consists of a straight line or lines; 3) is bounded by a straight line or lines; or, 4) is otherwise characterized by a straight line or lines.

Relaxed Shape: As used in this disclosure, a structure is considered to be in its relaxed state when no shear, strain, or torsional forces are being applied to the structure.

Rouleau: As used in this disclosure, a rouleau is a tube or channel that is formed through a structure.

Shaft: As used in this disclosure, a shaft is a long and narrow prism structure that is used as: 1) a structural element of a larger object; or 2) as a grip or lever for a handle. Shafts often have a cylindrical shape.

Sheeting: As used in this disclosure, a sheeting is a material, such as a paper, textile, a plastic, or a metal foil, in the form of a thin flexible layer or layers.

Sleeve: As used in this disclosure, a sleeve is a tube-like covering that is placed over a rod, shaft or other cylindrical object.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Tenon: As used in this disclosure, a tenon is a prism-shaped structure that fits into a mortise such that the tenon attaches to the mortise. The tenon is geometrically similar to the mortise.

Textile: As used in this disclosure, a textile is a material that is woven, knitted, braided or felted. Synonyms in common usage for this definition include fabric and cloth.

Tool: As used in this disclosure, a tool is a device, an apparatus, or an instrument that is used to carry out an activity, operation, or procedure.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Weather: As used in this disclosure, the term weather refers to a collection of measurable parameters of the atmosphere including, but not limited to, temperature, humidity, precipitation, air movement caused by wind and energy and illumination from the sun. A structure that isolates an individual or object from the more uncomfortable or destructive aspects of the weather is said to provide protection against the weather. The term elements is often used to refer to weather.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A pet privacy barrier comprising
a barrier structure, a detachable canopy, and a base carpet;
wherein the barrier structure mounts on the base carpet;
wherein the detachable canopy removably attaches to the barrier structure;
wherein the pet privacy barrier is configured for use with a companion animal;
wherein the pet privacy barrier creates a protected space;
wherein the detachable canopy comprises a second textile sheeting, a plurality of beams, and a plurality of fittings;
wherein the plurality of beams and the plurality of fittings form an openwork structure on which the second textile sheeting drapes to form the detachable canopy;
wherein the plurality of beams comprises a first beam, a second beam, a third beam, a fourth beam, a fifth beam, a sixth beam, and a seventh beam;
wherein the first beam is a prism-shaped structure selected from the plurality of beams;
wherein the second beam is a prism-shaped structure selected from the plurality of beams;
wherein the third beam is a prism-shaped structure selected from the plurality of beams;

wherein the fourth beam is a prism-shaped structure selected from the plurality of beams;
wherein the fifth beam is a prism-shaped structure selected from the plurality of beams;
wherein the sixth beam is a prism-shaped structure selected from the plurality of beams;
wherein the seventh beam is a prism-shaped structure selected from the plurality of beams.

2. The pet privacy barrier according to claim 1
wherein the barrier structure is a vertically oriented structure that forms a portion of the boundary of the protected space;
wherein the detachable canopy is an elevated horizontally oriented structure that forms a portion of the boundary of the protected space;
wherein the base carpet forms an inferior structure of the pet privacy barrier;
wherein the base carpet forms a pedestal on which the barrier structure and the detachable canopy mount.

3. The pet privacy barrier according to claim 2 wherein the base carpet simulates turf.

4. The pet privacy barrier according to claim 3 wherein the barrier structure forms an opaque structure.

5. The pet privacy barrier according to claim 4
wherein the detachable canopy is a textile-based structure;
wherein the detachable canopy forms a superior structure of the pet privacy barrier;
wherein the detachable canopy removably attaches to the barrier structure;
wherein the detachable canopy protects the protected space from weather.

6. The pet privacy barrier according to claim 5
wherein the barrier structure comprises a first textile sheeting, a plurality of sleeves, and a plurality of stanchions;
wherein the plurality of sleeves attach the plurality of stanchions to the first textile structure.

7. The pet privacy barrier according to claim 6
wherein the first textile sheeting is a textile-based fabric structure;
wherein the first textile sheeting is formed from nylon;
wherein the first textile sheeting is cut in a rectilinear shape;
wherein the first textile sheeting forms an opaque vertical structure that creates the protected space formed by the pet privacy barrier.

8. The pet privacy barrier according to claim 7
wherein each of the plurality of sleeves forms a structure selected from the group consisting of a channel and a rouleau;
wherein each of the plurality of sleeves attaches to the first textile sheeting.

9. The pet privacy barrier according to claim 8 wherein an end of each of the plurality of stanchions attaches to the base carpet;
wherein the end of each of the plurality of stanchions that is distal from the base carpet removably attaches to the detachable canopy;
wherein each of the plurality of stanchions is a prism-shaped shaft.

10. The pet privacy barrier according to claim 9
wherein each of the plurality of sleeves is sized to receive a stanchion selected from the plurality of stanchions;
wherein each of the plurality of sleeves attaches the selected stanchion to the first textile sheeting such that the selected stanchion holds the first textile sheeting in a vertical orientation.

11. The pet privacy barrier according to claim 10
wherein the plurality of sleeves comprises a first sleeve, a second sleeve, a third sleeve, and a fourth sleeve;
wherein the first sleeve is a rouleau structure that attaches to the first textile sheeting;
wherein the second sleeve is a channel structure that attaches to the first textile sheeting;
wherein the third sleeve is a channel structure that attaches to the first textile sheeting;
wherein the fourth sleeve is a rouleau structure that attaches to the first textile sheeting;
wherein each of the plurality of stanchions inserts into and through a sleeve selected from the plurality of sleeves.

12. The pet privacy barrier according to claim 11
wherein the plurality of stanchions comprises a first stanchion, a second stanchion, a third stanchion, and a fourth stanchion;
wherein the first stanchion is a prism-shaped shaft;
wherein the second stanchion is a prism-shaped shaft;
wherein the third stanchion is a prism-shaped shaft;
wherein the fourth stanchion is a prism-shaped shaft;
wherein the span of the length of the second stanchion equals the span of the length of the first stanchion;
wherein the span of the length of the third stanchion equals the span of the length of the second stanchion;
wherein the span of the length of the fourth stanchion equals the span of the length of the third stanchion.

13. The pet privacy barrier according to claim 12
wherein the second textile sheeting is a textile-based fabric structure;
wherein the second textile sheeting is formed from nylon;
wherein the second textile sheeting is cut in a rectilinear shape;
wherein the second textile sheeting forms the elevated structure that creates an opaque superior boundary of the protected space formed by the pet privacy barrier.

14. The pet privacy barrier according to claim 13
wherein each of the plurality of beams is a prism-shaped shaft;
wherein each of the plurality of beams removably attaches a fitting initially selected from the plurality of fittings to a fitting subsequently selected from the plurality of fittings;
wherein the plurality of fittings interconnect the plurality of beams to each other.

15. The pet privacy barrier according to claim 14
wherein the plurality of fittings comprises a first fitting, a second fitting, a third fitting, a fourth fitting, and a fifth fitting;
wherein the first fitting is a three-port fitting that attaches to the first beam, the seventh beam, and the first stanchion;
wherein the second fitting is a four-port fitting that attaches to the first beam, the second beam, the third beam, and the second stanchion;
wherein the third fitting is a four-port fitting that attaches to the third beam, the fourth beam, the fifth beam, and the third stanchion;
wherein the fourth fitting is a three-port fitting that attaches to the fifth beam, the sixth beam, and the fourth stanchion;
wherein the fifth fitting is a four-port fitting that attaches to the second beam, the fourth beam, the sixth beam, and the seventh beam.

16. The pet privacy barrier according to claim 15
wherein the base carpet comprises an artificial turf and a plurality of mounting mortises;

wherein the artificial turf is the element of the base carpet that provides the simulated turf on which the companion animal deposits befoulment;

wherein the artificial turf is a well-known and commercially available structure;

wherein the artificial turf covers a supporting surface such that the artificial turf protects the supporting surface from the deposited befoulment;

wherein each of the plurality of mounting mortises is mortise structure formed in the artificial turf;

wherein each of the plurality of mounting mortises receives a stanchion selected from the plurality of stanchions;

wherein each of the plurality of mounting mortises supports the selected stanchion such that the center axis of the prism structure of the selected stanchion projects vertically away from the artificial turf of the base carpet;

wherein the plurality of mounting mortises attach the barrier structure to the base carpet.

17. The pet privacy barrier according to claim 16 wherein the plurality of mounting mortises comprises a first mounting mortise, a second mounting mortise, a third mounting mortise, and a fourth mounting mortise;

wherein the first mounting mortise has a capped tube structure;

wherein the second mounting mortise has a capped tube structure;

wherein the third mounting mortise has a capped tube structure;

wherein the fourth mounting mortise has a capped tube structure;

wherein the following three paragraphs describe the assembly of the pet privacy barrier;

wherein the first stanchion inserts through the first sleeve of the barrier structure to insert into the first mounting mortise of the base carpet;

wherein the second stanchion inserts through the second sleeve of the barrier structure to insert into the second mounting mortise of the base carpet;

wherein the third stanchion inserts through the third sleeve of the barrier structure to insert into the third mounting mortise of the base carpet;

wherein the fourth stanchion inserts through the fourth sleeve of the barrier structure to insert into the fourth mounting mortise of the base carpet;

wherein the end of the first stanchion that is distal from the first mounting mortise inserts into the first fitting;

wherein the second stanchion that is distal from the second mounting mortise inserts into the second fitting;

wherein the third stanchion that is distal from the third mounting mortise inserts into the third fitting;

wherein the fourth stanchion that is distal from the fourth mounting mortise inserts into the fourth fitting;

wherein the first beam attaches the first fitting to the second fitting;

wherein the second beam attaches the second fitting to the fifth fitting;

wherein the third beam attaches the second fitting to the third fitting;

wherein the fourth beam attaches the third fitting to the fifth fitting;

wherein the fifth beam attaches the third fitting to the fourth fitting;

wherein the sixth beam attaches the fourth fitting to the fifth fitting;

wherein the seventh beam attaches the first fitting to the fifth fitting.

18. The pet privacy barrier according to claim 17 wherein the first textile sheeting further comprises an accessory station;

wherein the accessory station attaches to the first textile sheeting of the barrier structure;

wherein the station plate is a disk-shaped structure;

wherein the station plate forms a plate that attaches to the first textile sheeting of the barrier structure;

wherein the station plate forms a structure to which, a bag holder, the shovel and mount, and a bowl and mount attach;

wherein the bag holder is a containment structure attached to the station plate;

wherein the shovel and mount comprises a tool and the apparatus required to attach the tool to the station plate;

wherein the bowl and mount comprises a bowl and the apparatus required to attach the bowl to the station plate.

* * * * *